United States Patent
Ahrenfeldt et al.

(10) Patent No.: US 12,448,311 B2
(45) Date of Patent: Oct. 21, 2025

(54) METHOD AND SLURRY TREATMENT PLANT FOR REDUCING METHANE EMISSION FROM SLURRY

(71) Applicant: Stiesdal SkyClean A/S, Give (DK)

(72) Inventors: Jesper Ahrenfeldt, Kongens Lyngby (DK); Ulrik Birk Henriksen, Kongens Lyngby (DK); Rasmus Østergaard Gadsbøll, Kongens Lyngby (DK); Tobias Pape Thomsen, Ringsted (DK)

(73) Assignee: Stiesdal SkyClean A/S, Give (DK)

( * ) Notice: Subject to any disclaimer, the term of this patent is extended or adjusted under 35 U.S.C. 154(b) by 579 days.

(21) Appl. No.: 18/010,716

(22) PCT Filed: Jun. 23, 2021

(86) PCT No.: PCT/DK2021/050202
§ 371 (c)(1),
(2) Date: Dec. 15, 2022

(87) PCT Pub. No.: WO2021/259436
PCT Pub. Date: Dec. 30, 2021

(65) Prior Publication Data
US 2023/0331635 A1 Oct. 19, 2023

(30) Foreign Application Priority Data
Jun. 23, 2020 (EP) .................................... 20181606

(51) Int. Cl.
*C02F 11/13* (2019.01)
*A01C 3/02* (2006.01)
(Continued)

(52) U.S. Cl.
CPC ............. *C02F 11/13* (2019.01); *A01C 3/026* (2013.01); *C02F 11/10* (2013.01); *C02F 11/185* (2013.01);
(Continued)

(58) Field of Classification Search
CPC ..... B01D 15/1821; B01D 15/364; C02F 1/42; C02F 2103/08; C02F 1/06; B01J 43/00; Y02A 20/124; A23L 2/74; A23L 5/20
(Continued)

(56) References Cited

U.S. PATENT DOCUMENTS
2019/0010094 A1 1/2019 Bhalla et al.

FOREIGN PATENT DOCUMENTS
EP 0286616 A2 10/1988

OTHER PUBLICATIONS
International Search Report and Written Opinion for PCT/DK2021/050202 dated Sep. 27, 2021, 9 pages.

*Primary Examiner* — Ekandra S. Miller-Cruz
(74) *Attorney, Agent, or Firm* — BLANK ROME LLP (57) ABSTRACT

Disclosed is a method for reducing methane emission from slurry produced in a livestock farm. The method comprising the steps of guiding unheated slurry from the livestock farm to a slurry heat exchanger, raising the temperature of the unheated slurry in the slurry heat exchanger to at least 65# Celsius, guiding the at least 65# Celsius hot slurry to an intermediate slurry tank, raising the temperature of the heated slurry to at least 75# Celsius in the intermediate slurry tank, guiding the at least 75# Celsius hot slurry through the slurry heat exchanger to exchange heat with the unheated slurry to raise the temperature of the unheated slurry to the at least 65# Celsius and to cool the at least 75# Celsius hot slurry to at least below 40# Celsius, and guiding the at least below 40# Celsius cold slurry to a slurry reservoir. Furthermore, a slurry treatment plant for reducing methane emission from slurry is disclosed.

21 Claims, 4 Drawing Sheets

(51) Int. Cl.
*C02F 11/10* (2006.01)
*C02F 11/18* (2006.01)
*C02F 103/20* (2006.01)

(52) U.S. Cl.
CPC ...... *C02F 2103/20* (2013.01); *C02F 2209/02* (2013.01); *C02F 2301/046* (2013.01); *C02F 2303/04* (2013.01); *C02F 2303/10* (2013.01)

(58) Field of Classification Search
USPC .................................................. 210/769
See application file for complete search history.

METHOD AND SLURRY TREATMENT PLANT FOR REDUCING METHANE EMISSION FROM SLURRY

The present application is a national stage of International Application No. PCT/DK2021/050202, filed on Jun. 23, 2021, which claims priority to European Patent Application No. 20181606.3, filed on Jun. 23, 2020. Both of the aforementioned applications are hereby incorporated by reference in their entireties.

FIELD OF THE INVENTION

The present invention relates to a method and a slurry treatment plant for reducing methane emission from slurry.

BACKGROUND OF THE INVENTION

Methane ($CH_4$) is a significant contributor to climate change. In 2017, methane accounted for roughly 10 percent of all human-driven greenhouse gas emissions in the U.S., according to the EPA (Environmental Protection Agency). While methane is not the most abundant greenhouse gas in the atmosphere, it is among the most potent greenhouse gases, and in fact it is a more potent greenhouse gas than carbon dioxide (CO2), which is well established as having a negative influence on climate changes.

A great part of the worlds annual methane emissions come from livestock and other agricultural practices. It is found that slurry from livestock contributes significantly to emissions of methane, and thus reductions in methane emissions from livestock may prove as a viable path to combat climate changes. Methane emission from slurry is particularly a problem in agriculture where typically untreated slurry from e.g. livestock is kept for an extended amount of time, typically in silos, and subsequently spread over fields where conversion of slurry into methane occurs in the open air.

It is therefore an object of the present invention to provide for a way of reducing methane emission from slurry which at the same time is energy efficient.

THE INVENTION

The inventors have identified the above-mentioned problems and challenges related to methane emissions from slurry, and subsequently made the below-described invention which may reduce emission of methane from slurry.

The invention provides for a method for reducing methane emission from slurry produced in a livestock farm, said method comprising the steps of:
  guiding unheated slurry from said livestock farm to a slurry heat exchanger,
  raising the temperature of said unheated slurry in said slurry heat exchanger to at least 65° Celsius,
  guiding said at least 65° Celsius hot slurry to an intermediate slurry tank,
  raising the temperature of said heated slurry to at least 75° Celsius in said intermediate slurry tank,
  guiding said at least 75° Celsius hot slurry through said slurry heat exchanger to exchange heat with said unheated slurry to raise the temperature of said unheated slurry to said at least 65° Celsius and to cool said at least 75° Celsius hot slurry to at least below 40° Celsius, and
  guiding said at least below 40° Celsius cold slurry to a slurry reservoir.

The above method for reducing methane emission from slurry produced in a livestock farm is advantageous for several reasons. By raising the temperature of the slurry through heating in the slurry heat exchanger and in the intermediate slurry tank is achieved that microorganisms which may be present in the unheated slurry are destroyed/killed. Microorganisms typically present in slurry, such as bacteria, contributes to methane emission through their ability of converting organic material present in slurry into methane, and therefore, by destroying/killing such microorganisms by the above method is achieved that the treated slurry contains little to none residual microorganisms and thus the rate of conversion of organic material present in slurry into methane is greatly reduced. By this treatment of slurry is achieved a significant reduction in greenhouse gas emissions from agriculture, such as a reduction of one third of agricultural greenhouse gas emissions.

The above method is further advantageous in that it provides for an energy efficient way of heating slurry produced in a livestock farm. In particular, the two-step heating process according to the above method (heating in the slurry heat exchanger followed by heating in the intermediate slurry tank) is energy efficient since the heat energy of the at least 75° Celsius hot slurry is transferred to the unheated slurry in the slurry heat exchanger thus raising the temperature of the unheated slurry.

In the context of the present invention, "slurry" should be understood as a mix made up of animal faeces and urine (it may also contain water coming from drinkers, food coming from troughs, and straw) that in a livestock farm normally accumulates under slats, i.e., in a slurry pit.

In the context of the present invention, a "slurry heat exchanger" should be understood as any kind of unit capable of transferring heat from a first stream of slurry to a second stream of slurry without the two streams of slurry having to mix together or come into direct contact.

In the context of the present invention, an "intermediate slurry tank" should be understood as any kind of tank capable of receiving and storing heated slurry and capable of further heating the already heated slurry. The heating capability of the intermediate slurry tank may be provided for by a heating element of the intermediate slurry tank and/or by transfer of heat using a heat pump.

In the context of the present invention, a "slurry reservoir" should be understood as any kind of reservoir, container, tank, silo, or storage unit capable of storing slurry.

In an aspect of the invention, the temperature of said at least 65° Celsius hot slurry is raised to a temperature in the range from 70° Celsius to 100° Celsius, preferably in the range from 80° Celsius to 95° Celsius, in said intermediate slurry tank.

By further raising the temperature of the at least 65° Celsius hot slurry to a temperature in the range from 70° Celsius to 100° Celsius, preferably in the range from 80° Celsius to 95° Celsius, is achieved an improved effectiveness in destroying/killing the microorganisms present in the slurry.

In an aspect of the invention, the temperature of said unheated slurry is raised to a temperature in the range from 65° Celsius to 80° Celsius in said slurry heat exchanger.

Raising the temperature of the unheated slurry to a temperature in the range from 65° Celsius to 80° Celsius in the slurry heat exchanger is advantageous in that if the temperature is not raised above 65° Celsius the risk of methane producing microorganisms not being destroyed is increased. However, there is no need to raise the temperature above 80° Celsius in that this will only mean that the system is less energy efficient—i.e. increase cost—in that substantially all microorganisms will have been killed at 80° Celsius. I.e. the present temperature range presents an advantageous relationship between cost and efficiency.

In an aspect of the invention, said method comprises a further step of cooling said at least below 40° Celsius cold slurry to at least below 30° Celsius in a cooling unit.

Cooling the at least below 40° Celsius cold slurry to at least below 30° Celsius is advantageous in that evaporation of ammonia ($NH_3$) from the slurry may be reduced, and the production rate of methane from the conversion of organic material present in the slurry may also be lowered further.

In the context of the present invention, a "cooling unit" should be understood as any kind of unit capable of cooling slurry. The cooling unit may be an active cooling unit such as a chiller and the cooling unit may comprise a cooling circuit, a radiator, a heat exchanger, and/or any other suitable devices for actively cooling the slurry.

In an aspect of the invention, said method comprises a further step of cooling said at least below 40° Celsius cold slurry to a temperature in the range from 10° Celsius to 30° Celsius, such as in the range from 15° Celsius to 25° Celsius, for example 20° Celsius. This is advantageous in that evaporation of ammonia from the slurry may be reduced, and the production rate of methane from the conversion of organic material present in the slurry may also be lowered further.

In an aspect of the invention, ammonia produced in said slurry heat exchanger and/or said intermediate slurry tank is collected and guided to a mixing unit in which said ammonia is dissolved in at least a portion of said at least below 40° Celsius cold slurry.

Slurry from livestock contains ammonia which is the foundation for the nitrogen (N) fertilizer industry. Ammonia may be directly applied to soil as a plant nutrient or converted into a variety of common N fertilizers. Ammonia is well-known for having a high solubility in water—about 33 weight percentage ammonia at room temperature. Therefore, since slurry contains a liquid phase (e.g. urine from livestock) ammonia may be bound in slurry. The solubility of ammonia in water is strongly affected by temperature with decreased solubility at higher temperatures. As an example, the solubility of ammonia in water is below 10 weight percent ammonia at 75° Celsius.

Thus, by heating slurry produced in a livestock farm, ammonia is released from the slurry thereby depriving the slurry from its nutrient properties. For this reason, it is advantageous to collect the ammonia produced/released in the slurry heat exchanger and/or intermediate slurry tank and dissolve the collected ammonia in at least a portion of the at least below 40° Celsius cold slurry. By doing so, the slurry may regain its nutrient properties since the ammonia originally released from the heated slurry May bind with the slurry again at a lower temperature. It is further advantageous to cool the slurry, such as by cooling the slurry with a cooling unit, prior to mixing the slurry with ammonia in the mixing unit since then a greater amount of ammonia may be dissolved in the slurry.

In the context of the present invention, a "mixing unit" should be understood as any kind of unit capable of dissolving ammonia in slurry. The mixing unit may be a mixing tank or a mixing vessel.

In an aspect of the invention, said portion of said at least below 40° Celsius cold slurry in which ammonia is dissolved is guided to an auxiliary slurry reservoir.

By guiding the portion of slurry in which ammonia is dissolved into an auxiliary slurry reservoir the cold slurry may be stored separate from the remaining portion of slurry which is guided to the slurry reservoir for storage. Hereby is advantageously provided for storage of two different slurry products having different nutritional properties.

In the context of the present invention, an "auxiliary slurry reservoir" should be understood as any kind of reservoir, container, tank or storage unit capable of storing slurry.

In an aspect of the invention, said at least 65° Celsius hot slurry is guided through an auxiliary slurry heat exchanger for further heating of said hot slurry before said step of guiding said hot slurry to said intermediate slurry tank.

By guiding the at least 65° Celsius hot slurry through an auxiliary slurry heat exchanger for further heating of the slurry is advantageous in that an improved efficiency of the method of reducing methane emission from slurry may be achieved. A further/auxiliary slurry heat exchanger may be utilized for further heating of slurry by heat exchange with heat streams stemming from other already available sources of heat within a slurry treatment plant operating according to the method of the present invention. Thereby, the amount of heat needed to be put into the intermediate slurry tank may be reduced in order to obtain the at least 75° Celsius in the intermediate slurry tank. This is particularly advantageous if the intermediate slurry tank is powered by external power source(s), such as by a power grid, where the power needed from the external power source(s) may be reduced.

In the context of the present invention, an "auxiliary slurry heat exchanger" should be understood as any kind of unit capable of transferring heat from a heat stream to a stream of slurry without the two streams having to mix together or come into direct contact. The heat stream may stem from various sources of heat within a slurry treatment plant operating according to the method of the present invention. For example, the hot stream may be a stream of a hot gas (e.g. combustion gases) or a hot liquid (heated water).

In an aspect of the invention, ammonia produced in said slurry heat exchanger and/or said intermediate slurry tank is collected and guided to a combustion chamber for combustion of said ammonia, and wherein exhaust gases of said combustion is guided to said auxiliary slurry heat exchanger to exchange heat with said at least 65° Celsius hot slurry to raise the temperature of said at least 65° Celsius hot slurry.

Ammonia produced by the heating of slurry in the slurry heat exchanger and/or the intermediate slurry tank may advantageously be used to increase the temperature of the slurry before the slurry enters the intermediate storage tank. By combusting ammonia within a combustion chamber, a hot exhaust gas is provided which may be used in the auxiliary slurry heat exchanger as a heat stream to be used to transfer heat to the slurry through heat exchange.

In the context of the present invention, a "combustion chamber" should be understood as any kind of furnace or chamber capable of combusting a fluid such as ammonia gas. The combustion of ammonia may according to an embodiment of the invention be accompanied by combustion of other fuels/fuel gases in the same combustion chamber.

In an aspect of the invention, the temperature of said at least 65° Celsius hot slurry is raised to at least 80° Celsius in said auxiliary slurry heat exchanger.

Raising the temperature of the at least 65° Celsius hot slurry to at least 80° Celsius in the auxiliary slurry heat exchanger is advantageous in that this ensures that substantially all microorganisms are killed.

In an aspect of the invention, ventilation air from said livestock farm is guided to said combustion chamber and combusted together with said ammonia.

In a livestock farm, animals, such as pigs, are typically kept indoors under a roof and this may result in the air within being smelly due to the presence of ammonia and methane. In many cases, unpleasant smells from such a livestock farm may be registered not only within the livestock farm but also in the nearby surroundings of the livestock farm to the discomfort of people living by or passing by the livestock farm.

To promote a good climate for livestock, the livestock farm is ventilated and thus ventilation air from a livestock farm may contain ammonia and methane.

By guiding ventilation air from the livestock to the combustion chamber for combustion is advantageous for several reasons. Firstly, a significant reduction of smell within the livestock farm as well as its surroundings may be achieved, and secondly, the ventilation air comprising ammonia and methane which may be combusted and thereby used to provide heat to the slurry by heat exchange in the auxiliary slurry heat exchanger and thus increase the energy efficiency of the method according to the present invention. Thirdly, combustion of ammonia and methane from the ventilation air of the livestock farm may further reduce the climate footprint of agriculture.

In an aspect of the invention, one or more fuel gases are supplied to said combustion chamber for combustion of said fuel gases.

By supplying one or more fuel gases to the combustion chamber for combustion of the fuel gases may be achieved an increase in the temperature of exhaust gases produced by the combustion chamber and this may result in an increased heat transfer rate of heat from exhaust gas to the slurry in the auxiliary slurry heat exchanger.

In the context of the present invention, "fuel gases" should be understood as any one of a number of fuels that under ordinary conditions are gaseous. The fuel gas may be composed of hydrocarbons (such as methane, biogas or propane), carbon monoxide, or mixtures thereof. Such gases are sources of potential heat energy that can be readily transmitted and distributed through pipes from the point of origin directly to the place of consumption/combustion.

In an aspect of the invention, heat is provided to said intermediate slurry tank by a heat pump arranged to transfer heat energy from said at least below 40° Celsius cold slurry to said intermediate slurry tank.

According to an aspect of the invention, heat is provided to said intermediate slurry tank by a heat pump arranged to transfer heat energy from said at least below 30° Celsius cold slurry to said intermediate slurry tank.

Providing heat to the intermediate slurry tank by a heat pump arranged to transfer heat energy from the at least below 40° Celsius cold slurry, such as the at least below 30° Celsius cold slurry which may be achieved by use of a cooling unit, to the intermediate slurry tank is advantageous for at least two reasons. Firstly, by supplying heat energy to the intermediate slurry tank may be achieved a reduction in the reliance of externally supplied power for heating, and secondly, the slurry which has undergone a heat treatment according to the present invention may be cooled even further. Cooling the slurry which has undergone the heat treatment is advantageous in that evaporation of ammonia ($NH_3$) from the slurry may be reduced, and the production rate of methane from the conversion of organic material present in the slurry may also be lowered further.

In the context of the present invention, a "heat pump" should be understood as any kind of device that is arranged to take an amount of heat $Q_c$ from a source (a "cold" region) at a temperature $T_c$ and reject an amount of heat $Q_h$ to a sink (hot region) at a temperature $T_h$ by spending an amount W of mechanical energy. A simple energy balance gives $$Q_h=Q_c+W$$

meaning that an amount of heat at lower temperature is pumped out at a higher temperature by adding the amount of spent energy. The at least below 40° Celsius cold slurry, such as the at least below 30° Celsius cold slurry, is correspondingly at a lower temperature $T_c$ than the higher temperature $T_h$ present in the intermediate slurry tank, and thus a heat pump is advantageous for further reducing the temperature of the heat treated slurry while delivering heat energy to the heating process in the intermediate slurry tank.

In an aspect of the invention, at least a portion of said at least below 40° Celsius cold slurry is guided back to said livestock farm and into said slurry heat exchanger.

In an aspect of the invention, said at least below 40° Celsius cold slurry is guided back to said livestock farm and into said slurry heat exchanger at least by a slurry feedback conduit. In the context of the present invention, a "slurry feedback conduit" should be understood as any kind of conduit capable of guiding slurry. The slurry feedback conduit may comprise any number of conduit elements, such as tubes, ducts, conduits, or other elements suitable for the transport of slurry along a path.

Guiding at least a portion of said at least below 40° Celsius cold slurry, or said at least below 30° Celsius cold slurry when a cooling unit is used, back to said livestock farm and into said slurry heat exchanger is advantageous in that a further reduction in methane emission may be achieved. This feedback of treated slurry into the livestock farm and slurry heat exchanger may effectively work as a flushing of any piping, tubing, conduits, or gutters of the livestock farm through which untreated slurry is guided from the livestock to the slurry heat exchanger. Such a flushing may be advantageous in that slurry residues may otherwise become stuck in such piping, tubing, conduits, or gutters and thereby release methane. The at least below 40° Celsius cold slurry may be guided back to the livestock farm and into the slurry heat exchanger continuously or preferably intermittently, such as at fixed time intervals for fixed time durations.

In an aspect of the invention, said hot slurry guided to said intermediate slurry tank is kept in said intermediate slurry tank for at least 10 minutes.

The hot slurry may be kept within the intermediate slurry tank for at least 10 minutes, such as for a time duration between 15 minutes to 90 minutes. Keeping the hot slurry within the intermediate slurry tank for at least 10 minutes is advantageous in that it may be assured that most, or all, microorganisms present in the slurry are effectively destroyed/killed.

Furthermore, the invention provides for a slurry treatment plant for reduction of methane emission from slurry produced in a livestock farm, said slurry treatment system comprising:
  a slurry receiving tank,
  a slurry pump,
  a slurry heat exchanger arranged to receive unheated slurry from said livestock farm and raise the temperature of said unheated slurry to at least 65° Celsius,
  an intermediate slurry tank arranged to receive said at least 65° Celsius hot slurry from said slurry heat exchanger and raise the temperature of said heated slurry to at least 75° Celsius, wherein said slurry heat exchanger is further arranged to receive said at least 75° Celsius hot slurry and exchange heat with said unheated slurry to raise the temperature of said unheated slurry to said at least 65° Celsius and to cool said at least 75° Celsius hot slurry to at least below 40° Celsius, and a slurry reservoir arranged to receive and store said at least below 40° Celsius cold slurry.

The above described slurry treatment plant is advantageous in that it provides for an energy efficient way of heat-treating slurry from a livestock farm such that methane emissions from the slurry may be reduced. The slurry treatment plant may advantageously be placed in close proximity to the livestock farm, preferably at the livestock farm as close as possible to the slurry-producing livestock since the conversion process of organic material present in slurry into methane occurs right from the time when slurry is produced. Thus, by placing the slurry treatment plant close to the livestock farm may be achieved a further reduction in methane emission than if the slurry treatment plant is placed far away from the livestock farm and where the slurry is transported and during which transport methane is emitted.

In the context of the present invention, a "slurry receiving tank" should be understood as any kind of tank capable of receiving slurry produced by livestock from a livestock farm. The slurry receiving tank may be a dedicated tank, reservoir, or container, of the slurry treatment plant or it may be an already existing slurry tank present at the livestock farm such as a slurry tank directly present underneath the slurry-producing livestock. Alternatively, the slurry receiving tank may be an intermediate tank coupling to already existing piping, tubing, or gutters of the livestock farm.

In an aspect of the invention, said slurry treatment plant is arranged to carry out the method for reducing methane emission from slurry produced in a livestock farm according to any of the above described aspects of the invention. Thus, any advantages described in relation to the above described aspects of the method for reducing methane emission from slurry produced in a livestock farm applies equally well to the slurry treatment plant.

In an aspect of the invention, said slurry treatment plant comprises a first slurry conduit configured to guide said at least 65° Celsius hot slurry from said slurry heat exchanger to said intermediate slurry tank.

In an aspect of the invention, said slurry treatment plant comprises a second slurry conduit configured to guide said at least 75° Celsius hot slurry from said intermediate slurry tank to said slurry heat exchanger.

In the context of the present invention, a "slurry conduit" should be understood as any kind of conduit capable of transporting slurry along a path. The slurry conduit, such as the first and/or second slurry conduit, may comprise any number of conduit elements, such as tubes, ducts, conduits, or other elements suitable for the transport of slurry along a path.

In an aspect of the invention, said first slurry conduit comprises said auxiliary slurry heat exchanger. The auxiliary slurry heat exchanger may thus form part of the first slurry conduit, or put in other words, the first slurry conduit may represent a path that runs through the auxiliary slurry heat exchanger.

In an aspect of the invention, said slurry treatment plant comprises a cooling unit arranged to cool said at least below 40° Celsius cold slurry to a temperature below at least 30° Celsius.

In an aspect of the invention, said slurry treatment plant comprises a mixing unit and a first gas conduit, wherein said first gas conduit is arranged to guide ammonia from said slurry heat exchanger and/or said intermediate slurry tank to said mixing unit, and wherein said mixing unit is arranged to dissolve ammonia received from said first gas conduit in at least a portion of said at least below 40° Celsius cold slurry.

In an aspect of the invention, said slurry treatment plant comprises an auxiliary slurry heat exchanger arranged to raise the temperature of said at least 65° Celsius hot slurry. The auxiliary slurry heat exchanger may according to an aspect of the invention form part of said first slurry conduit.

In an aspect of the invention, said slurry treatment plant comprises an auxiliary slurry reservoir.

In an aspect of the invention, said slurry treatment plant comprises a second gas conduit, a combustion chamber, and an exhaust gas conduit, wherein said second gas conduit is configured to guide ammonia from said slurry heat exchanger and/or said intermediate slurry tank to said combustion chamber for combustion of said ammonia, and wherein said exhaust gas conduit is configured to guide exhaust gases of said combustion to said auxiliary slurry heat exchanger.

In the context of the present invention, a "gas conduit", such as a first and a second gas conduit, should be understood as any kind of conduit capable of guiding gas, such as ammonia. The gas conduit may comprise any number of conduit elements such as tubes, ducts, conduits, or other elements suitable for guiding gases such as ammonia. Similarly, in the context of the present invention, an "exhaust gas conduit" should be understood as any kind of conduit capable of guiding combusted gas, i.e. exhaust gases. The exhaust gas conduit may comprise any number of conduit elements such as tubes, ducts, conduits, or other elements suitable for guiding gases such as exhaust gases.

In an aspect of the invention, said slurry treatment plant comprises a ventilation air conduit configured to guide ventilation air from said livestock farm to said combustion chamber for combustion of said ventilation air.

In the context of the present invention, a "ventilation air conduit" should be understood as any kind of conduit capable of guiding ventilation air from a livestock farm. The ventilation air conduit may comprise any number of conduit elements such as tubes, ducts, conduits, or other elements suitable for guiding ventilation air. The ventilation air conduit may form part of the livestock farm and may for example be integrated within or mounted to an already existing ventilation air system of a livestock farm.

In an aspect of the invention, said intermediate slurry tank comprises at least one heating element arranged to raise the temperature of said at least 65° Celsius hot slurry to at least 75° Celsius in said intermediate slurry tank.

A heating element is advantageous in that it provides for a simple and reliable way of heating slurry in the intermediate slurry tank.

In the context of the present invention, a "heating element" should be understood as any kind of element suitable for mounting in the intermediate slurry tank and for heating of slurry. The heating element may be an electrically based element which is arranged to convert electrical energy into heat such as through resistive heating where electric current through the element encounters resistance, resulting in heating of the element. The heating element may for example be of the type metallic resistance heating element, ceramic- and semiconductor-based heating elements. The intermediate slurry tank may comprise more than one heating element such as two or more heating elements for e.g. improved distribution of heating within the intermediate slurry tank.

In an alternative aspect of the invention, said slurry treatment plant comprises a heat pump arranged to provide heat to said intermediate slurry tank by transfer of heat from said at least below 30° Celsius cold slurry to said intermediate slurry tank.

FIGURES

The invention will be described in the following with reference to the figures in which.

DETAILED DESCRIPTION

Figure 1:
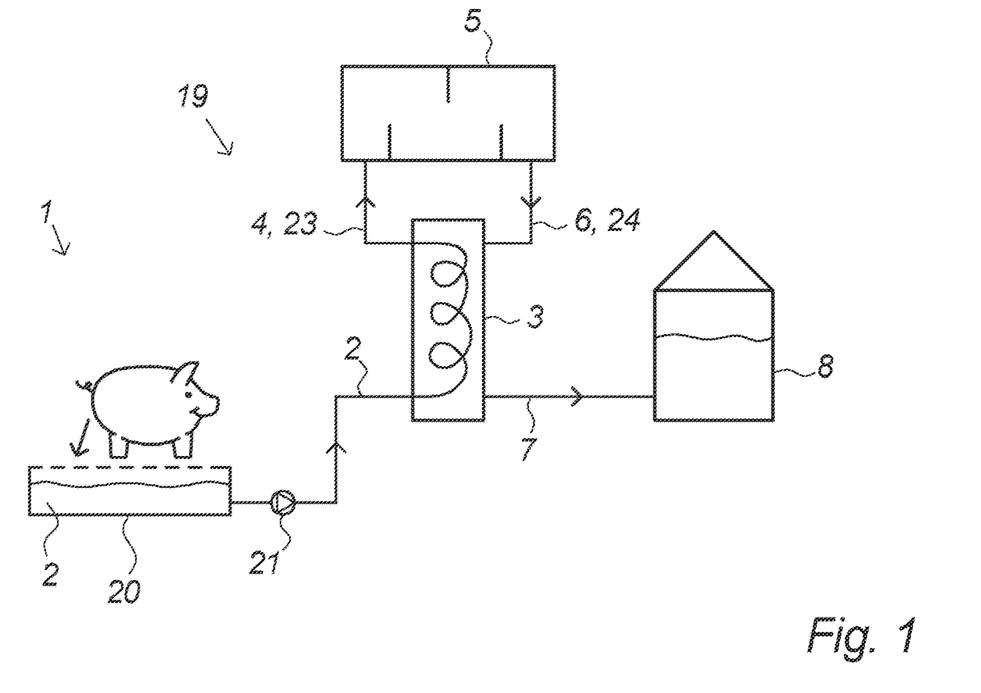
FIG. 1 illustrates a method of and a slurry treatment plant for reducing methane emission from slurry produced in a livestock farm according to an embodiment of the invention.

FIG. 1 illustrates a method for reducing methane emission from slurry produced in a livestock farm 1 according to an embodiment of the invention. As shown in the exemplary embodiment of FIG. 1, the method is carried out by a slurry treatment plant 19. For sake of simplicity of the drawing, the livestock farm 1 is represented as a single animal (a pig in this example), however by a livestock farm is naturally understood a farm which houses several livestock.

The livestock of the livestock farm 1 contributes, through their release of urine and faeces, to the production of slurry. The slurry is captured in a slurry receiving tank 20 which is a reservoir/tank underneath the livestock where untreated slurry 2 from the livestock is initially received. The slurry receiving tank 20 shown in this embodiment is a reservoir which spans the entire area underneath the livestock in the livestock farm, however in other embodiments of the invention, the slurry receiving tank 20 may be a distributed receiving tank comprising one or more receiving areas which are joined together by tubing/piping to form a larger effective receiving tank. The untreated slurry 2 is pumped by a slurry pump 21 to a slurry heat exchanger 3. The slurry pump 21 of this embodiment of the invention is shown as a centrifugal pump, however, in other embodiments of the invention the slurry pump 21 may be of different pump designs such as a positive displacement pump or rotary pump.

The untreated slurry 2 which has been pumped into the slurry heat exchanger 3 is next heated by exchange of heat with already heated slurry in the slurry heat exchanger to a temperature of at least 65° Celsius. The now at least above 65° Celsius hot slurry 4 is guided by a first slurry conduit 23 into an intermediate slurry tank 5 for further heating. The intermediate slurry tank 5, which is a tank configured for receiving and heating slurry, is used to heat the at least 65° Celsius hot slurry to a temperature of at least 75° Celsius. The slurry 4 received in the intermediate slurry tank 5 is kept within the intermediate slurry tank 5 for at least 10 minutes, however in other embodiments of the invention the slurry 4 may be kept in the intermediate slurry tank 5 for a greater time duration, and in yet other embodiments of the invention, the slurry 4 may be kept in the intermediate slurry tank 5 for less than 10 minutes.

Once heated in the intermediate slurry tank, the now at least above 75° Celsius hot slurry 6 is guided by a second slurry conduit 24 into the slurry heat exchanger 3 where an exchange of heat (heat energy) with the unheated slurry 2 occurs such that the temperature of the unheated slurry 2 increases while the temperature of the at least 75° Celsius hot slurry decreases accordingly. It is naturally understood that a reference to the at least 75° Celsius hot slurry is to be understood as a reference to the slurry which have passed through the intermediate slurry tank 5 and thus a heat transfer from this slurry to the unheated slurry 2 may naturally also occur at temperatures below 75° Celsius.

Once the at least 75° Celsius hot slurry 6 which entered the slurry heat exchanger 3 has passed through the slurry heat exchanger 3 its temperature is reduced to at least below 40° Celsius. The cooling of the slurry after its heat treatment is advantageous since then evaporation of methane and ammonia may be reduced.

The now at least below 40° Celsius cold slurry 7 is finally guided to a slurry reservoir 8 for storage. In this embodiment of the invention the slurry reservoir takes the form of a silo, however according other embodiments of the invention the slurry reservoir may take other forms such as a container or a tank, or any other kind of reservoir or storage unit configured to store slurry.

It should be understood from FIG. 1 that lines comprising arrows which indicate directions in which slurry is guided according to the method, equally well indicates appropriate piping, tubing, conduits, or gutters of the slurry treatment plant 19 by means of which slurry is guided through the slurry treatment plant 19.

Figure 2:
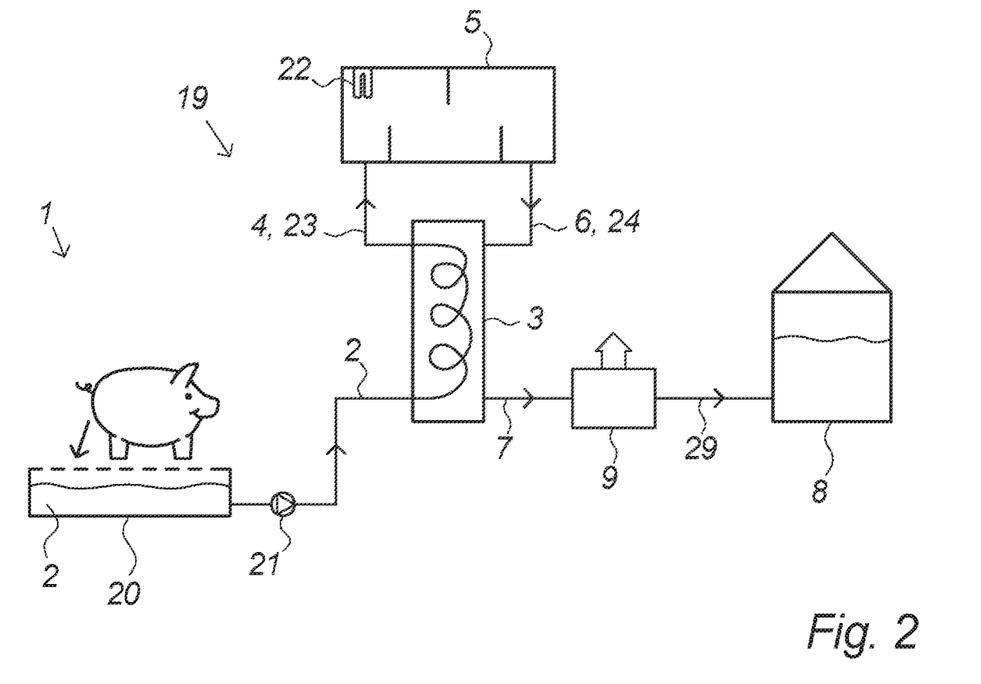
FIG. 2 illustrates an embodiment of the invention wherein heat-treated slurry is further cooled by a cooling unit.

FIG. 2 illustrates a method for reducing methane emission from slurry produced in a livestock farm 1 according to another embodiment of the invention. As shown in the exemplary embodiment of FIG. 2, the method is carried out by a slurry treatment plant 19. The embodiment of the invention as represented by FIG. 2 is like the embodiment of the invention as shown in FIG. 1 with the exception that the embodiment of FIG. 2 shows a cooling unit 9. The cooling unit 9 is configured to reduce the temperature of the at least below 40° Celsius cold slurry 7 to a temperature below at least 30° Celsius. The at least below 30° Celsius cold slurry 29 is guided to the slurry tank 8 for storage.

As further shown in the embodiment of FIG. 2, the intermediate slurry tank 5 comprises a heating element 22 arranged to increase the temperature of the at least 65° Celsius hot slurry 4 which is guided to the intermediate slurry tank 5. As shown in this embodiment of the invention, the intermediate slurry tank comprises a single heating element 22, however in other embodiments of the invention, the intermediate slurry tank 5 may comprise more than one heating element 22 such as two or more heating elements 22. In yet other embodiments of the invention, the heating of the slurry in the intermediate slurry tank 5 is ensured by heat energy supplied to the intermediate slurry tank 5 by a heat pump 18.

Figure 3:
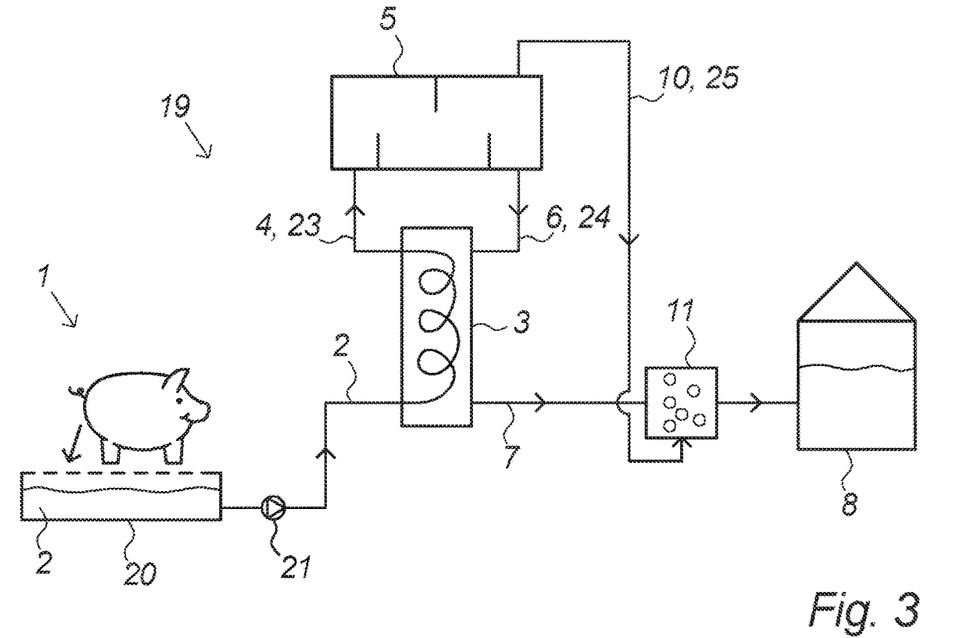
FIG. 3 illustrates an embodiment of the invention wherein ammonia produced by heating of slurry is dissolved in slurry in a mixing unit.

FIG. 3 illustrates a method for reducing methane emission from slurry produced in a livestock farm 1 according to an embodiment of the invention. As shown in the exemplary embodiment of FIG. 3, the method is carried out by a slurry treatment plant 19. The embodiment of the invention as represented by FIG. 3 is like the embodiment of the invention as shown in FIG. 1 with the exception that ammonia is dissolved into the slurry after the heat treatment of slurry.

As the slurry is heated in the slurry heat exchanger 3 and the intermediate slurry tank 5 ammonia is released from the slurry since the solubility of ammonia in slurry decreases with increasing temperature of the slurry. The ammonia produced 10 from the heating of slurry is collected and guided by a first gas conduit 25 to a mixing unit 11. The mixing unit 11 of the present embodiment is a mixing tank, however according to other embodiments of the invention the mixing unit 11 may be a mixing vessel. The mixing tank 11 takes as input the at least below 40° Celsius cold slurry 7 as well as the ammonia 10 guided by the first gas conduit 25. Within the mixing tank 11 ammonia 10 is dissolved into the at least below 40° Celsius cold slurry. Hereby the slurry may regain its nutritional properties. The at least below 40° Celsius cold slurry 7 in which ammonia 10 is dissolved is guided to a slurry reservoir 8.

Figure 4:
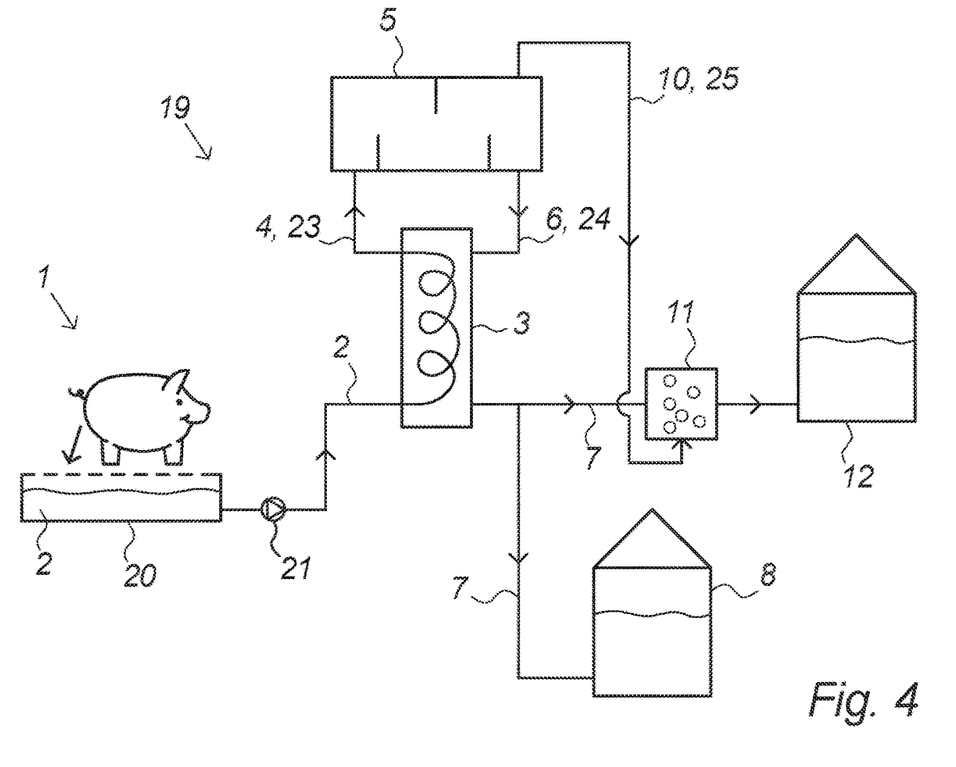
FIG. 4 illustrates an alternative embodiment of the invention wherein two slurry products are stored in respective slurry reservoirs.

FIG. 4 illustrates an embodiment of the invention which is an alternative to the embodiment of the invention illustrated in FIG. 3.

The at least below 40° Celsius cold slurry 7 is divided into two streams, where a first portion of the slurry is guided to a mixing unit 11, which in this embodiment of the invention is a mixing tank, where ammonia 10 produced from the heating of slurry in the slurry heat exchanger 3 and/or the intermediate slurry tank 5 is dissolved in the slurry. The portion of the at least below 40° Celsius cold slurry 7 into which ammonia 10 dissolved in the mixing tank 10 is guided to an auxiliary slurry reservoir 12 for storage. The other portion of the at least below 40° Celsius cold slurry is guided to a slurry reservoir 8 for storage. The slurry treatment plant 19 of the present embodiment is thus able to produce two different final slurry products from the same unheated slurry 2.

Figure 5:
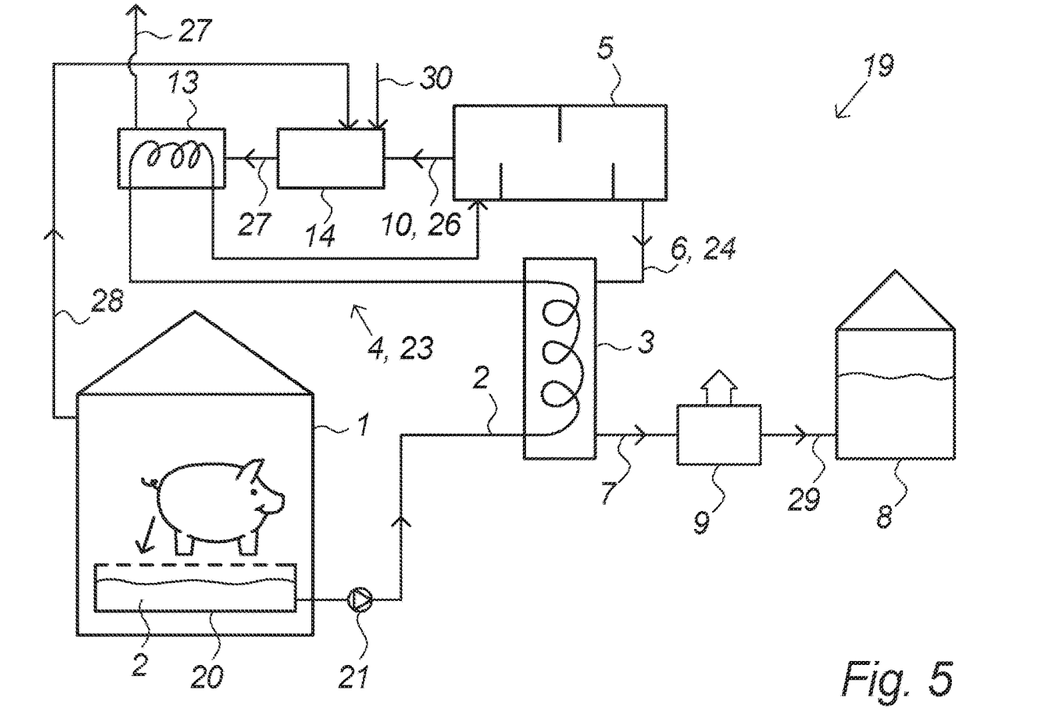
FIG. 5 illustrates an embodiment of the invention wherein slurry is further heated in an auxiliary slurry heat exchanger.

FIG. 5 illustrates a method for reducing methane emission from slurry produced in a livestock farm 1 according to an embodiment of the invention. As shown in the exemplary embodiment of FIG. 5, the method is carried out by a slurry treatment plant 19. Unheated slurry 2 produced at a livestock farm 1 is pumped using a slurry pump 21 into a slurry heat exchanger 3 where the temperature of the slurry is increased to a temperature of at least 65° Celsius. The now at least 65° Celsius hot slurry 4 is next guided by a first slurry conduit 23 to an intermediate slurry tank 5. The first slurry conduit 23 of this embodiment comprises a path which runs through an auxiliary slurry heat exchanger 13. The auxiliary slurry heat exchanger 13 is arranged to further increase the temperature of the at least 65° Celsius hot slurry by exchange of heat with another heat source. After heating in the auxiliary slurry heat exchanger 13, the slurry is guided to the intermediate slurry tank for further heating. The auxiliary slurry heat exchanger 13 is arranged to heat slurry by exchange of heat with exhaust gases from a combustion chamber 14.

The combustion chamber 14 is arranged to combust ammonia produced from the heating of slurry in the slurry heat exchanger 3 and/or the intermediate slurry tank 5. In this embodiment of the invention is shown that ammonia 10 is collected from the intermediate slurry tank 5 and guided to the combustion chamber 14 by a second gas conduit 26. The combustion chamber 14 of the present embodiment takes as input in addition to ammonia 10 also a fuel gas 30 in the form of biogas. However, in other embodiments of the invention the fuel gas may be other types of gases such as methane, propane, or other flammable gases. Furthermore, the combustion chamber 14 of the present embodiment of the invention takes ventilation air from the livestock farm 1 as input. The ventilation air of the livestock farm 1 is guided by a ventilation air conduit 28 to the combustion chamber. In this embodiment of the invention, the ventilation air conduit 28 is configured to be attached to an already existing ventilation air system of the livestock farm 1, however, in other embodiments of the invention the ventilation air conduit 28 may also comprise a collecting unit which independently of an already existing ventilation air system may collect ventilation air from the livestock farm 1.

The at least below 40° Celsius cold slurry 7 is guided to a cooling unit 9 for cooling of the slurry to a temperature below at least 30° Celsius. The now at least below 30° Celsius cold slurry 29 is guided to a slurry reservoir 8 for storage.

Although not shown in this embodiment of the invention, ammonia from the intermediate slurry tank may also be collected and guided by a first gas conduit 25 and be dissolved into at least a portion, or all, of the at least below 40° Celsius cold slurry, such as at least below 30° Celsius cold slurry in a mixing unit 11 as also described in relation to various other embodiments of the invention.

Figure 6:
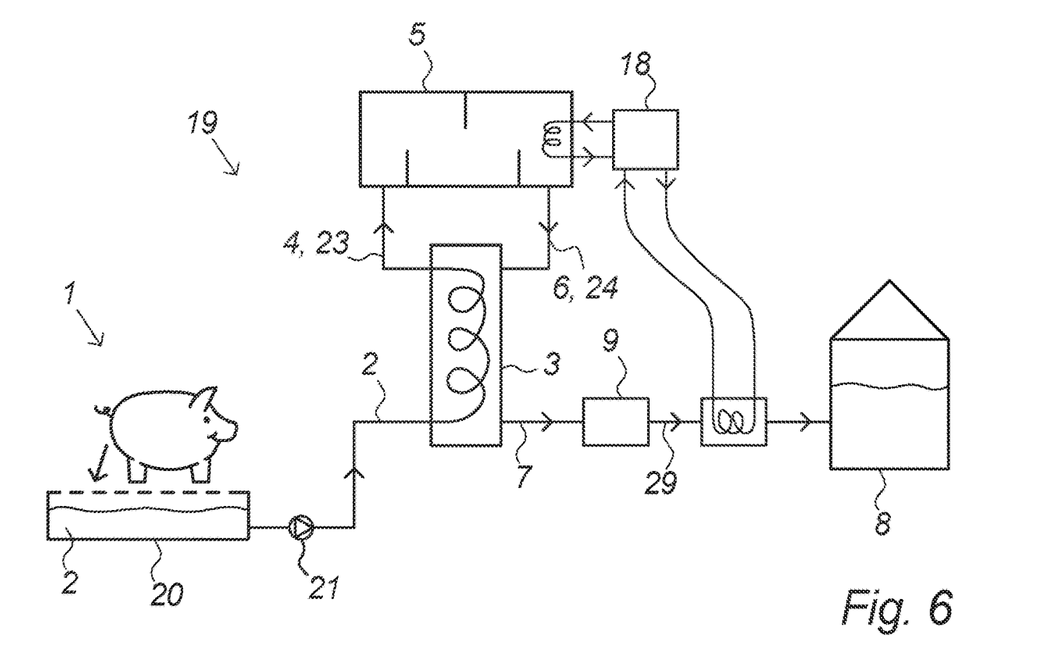
FIG. 6 illustrates an embodiment of the invention wherein slurry is heated in an intermediate slurry tank by a heat pump.

FIG. 6 illustrates a method for reducing methane emission from slurry produced in a livestock farm 1 according to an embodiment of the invention. As shown in the exemplary embodiment of FIG. 6, the method is carried out by a slurry treatment plant 19. The embodiment of the invention as represented by FIG. 6 is similar to the embodiment of the invention as shown in FIG. 2 with the exception that the embodiment of FIG. 6 further features a heat pump 18. The heat pump 18 further reduces the temperature of the at least below 30° Celsius cold slurry 29 to a temperature below at least 20° Celsius and in this example the temperature is reduced to between 10° Celsius to 15° Celsius before the slurry is guided into the slurry reservoir 8. The heat pump 18 thus takes heat energy from the at least below 30° Celsius and transfers heat to the intermediate slurry tank 5 for heating of slurry to a temperature of at least 75° Celsius in the intermediate slurry tank 5.

Although the heat pump 18 is shown together with a cooling unit 9 in the embodiment of the invention of the invention as shown in FIG. 6, it is noted that according to other embodiments of the invention, the slurry treatment plant 19 may feature just the heat pump 18 for additional cooling of slurry and thereby not also rely on the cooling unit 9. It should further be noted that according to other embodiments of the invention, the slurry treatment plant 19 may also feature combinations of the heat pump 18 with the mixing unit 11 and/or the auxiliary slurry heat exchanger 13 and combustion chamber 14.

Figure 7:
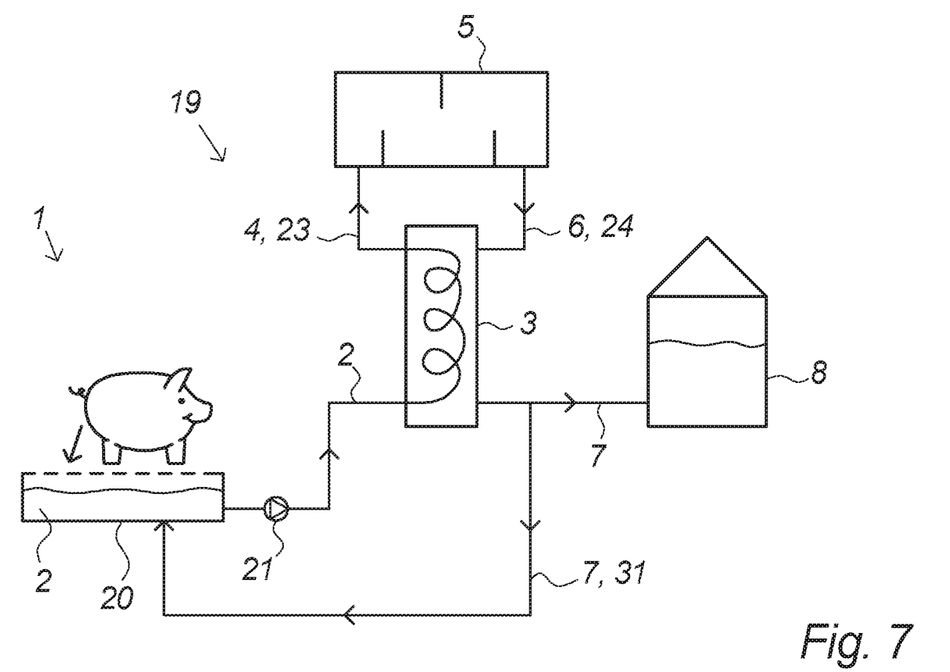
FIG. 7 illustrates an embodiment of the invention wherein at least a portion of heat-treated slurry is fed back to the livestock farm and the slurry heat exchanger of the slurry treatment plant.

FIG. 7 illustrates a method for reducing methane emission from slurry produced in a livestock farm 1 according to another embodiment of the invention. As shown in the exemplary embodiment of FIG. 7, the method is carried out by a slurry treatment plant 19. The embodiment of the invention as represented by FIG. 7 is like the embodiment of the invention as shown in FIG. 1 with the exception that a portion of the at least below 40° Celsius cold slurry 7 is guided back to the livestock farm 1 and into the slurry heat exchanger 3 by a slurry feedback conduit 31. Hereby is achieved that any conduits, piping, tubing, or gutters between the livestock farm 1 and the slurry treatment plant 19 is flushed which results in further reductions in methane emission from slurry.

Although specific embodiments of the invention have been shown in the drawings accompanying these embodiments, various components/units shown in these specific embodiments may be combined in different configurations in other embodiments of the invention. As an example, the cooling unit 9 disclosed in relation to the embodiments represented by FIGS. 2 and 5 may also be included in the slurry treatment plant 19 of the embodiments of the invention comprising a mixing unit 11, e.g. in the embodiments shown on FIGS. 3 and 4. Cooling the at least below 40° Celsius cold slurry 7 prior to dissolving ammonia 10 in the slurry in the mixing unit 11 is advantageous in that a greater amount of ammonia 10 may be dissolved in the slurry.

List

1 Livestock farm
2 Unheated slurry
3 Slurry heat exchanger
4 Hot slurry (at least 65° Celsius)
5 Intermediate slurry tank
6 Hot slurry (at least 75° Celsius)
7 Cold slurry (at least below 40° Celsius)
8 Slurry reservoir
9 Cooling unit
10 Ammonia
11 Mixing unit
12 Auxiliary slurry reservoir
13 Auxiliary slurry heat exchanger
14 Combustion chamber
15 Exhaust gases
16 Ventilation air
17 Fuel gas
18 Heat pump
19 Slurry treatment plant
20 Slurry receiving tank
21 Slurry pump
22 Heating element
23 First slurry conduit
24 Second slurry conduit
25 First gas conduit
26 Second gas conduit
27 Exhaust gas conduit
28 Ventilation air conduit
29 Cold slurry (at least below 30° Celsius)
30 Fuel gas
31 Slurry feedback conduit

The invention claimed is:

1. A method for reducing methane emission from slurry produced in a livestock farm, said method comprising the steps of: guiding unheated slurry from said livestock farm to a slurry heat exchanger, raising a temperature of said unheated slurry in said slurry heat exchanger to at least 65° Celsius, guiding said at least 65° Celsius hot slurry to an intermediate slurry tank, raising the temperature of said heated slurry to at least 75° Celsius in said intermediate slurry tank, guiding said at least 75° Celsius hot slurry through said slurry heat exchanger to exchange heat with said unheated slurry to raise the temperature of said unheated slurry to said at least 65° Celsius and to cool said at least 75° Celsius hot slurry to at most 40° Celsius, and guiding said at most 40° Celsius cold slurry to a slurry reservoir.

2. The method according to claim 1, wherein the temperature of said at least 65° Celsius hot slurry is raised to a temperature in the range from 70° Celsius to 100° Celsius.

3. The method according to claim 1, wherein the temperature of said unheated slurry is raised to a temperature in the range from 65° Celsius to 80° Celsius in said slurry heat exchanger.

4. The method according to claim 1, wherein said method comprises a further step of cooling said at most 40° Celsius cold slurry to at most 30° Celsius in a cooling unit.

5. The method according to claim 1, wherein said method comprises a further step of cooling said at most 40° Celsius cold slurry to a temperature in the range from 10° Celsius to 30° Celsius, such as in the range from 15° Celsius to 25° Celsius.

6. The method according to claim 1, wherein ammonia produced in said slurry heat exchanger or said intermediate slurry tank is collected and guided to a mixing unit in which said ammonia is dissolved in at least a portion of said at most 40° Celsius cold slurry.

7. The method according to claim 1, wherein said at least 65° Celsius hot slurry is guided through an auxiliary slurry heat exchanger for further heating of said hot slurry before said step of guiding said hot slurry to said intermediate slurry tank.

8. The method according to claim 7, wherein ammonia produced in said slurry heat exchanger or said intermediate slurry tank is collected and guided to a combustion chamber for combustion of said ammonia, and wherein exhaust gases of said combustion is guided to said auxiliary slurry heat exchanger to exchange heat with said at least 65° Celsius hot slurry to raise the temperature of said at least 65° Celsius hot slurry.

9. The method according to claim 7, wherein the temperature of said at least 65° Celsius hot slurry is raised to at least 80° Celsius in said auxiliary slurry heat exchanger.

10. The method according to claim 1, wherein at least a portion of said at most 40° Celsius cold slurry is guided back to said livestock farm and into said slurry heat exchanger.

11. The method according to claim 1, wherein said hot slurry guided to said intermediate slurry tank is kept in said intermediate slurry tank for at least 10 minutes.

12. A slurry treatment plant for reduction of methane emission from slurry produced in a livestock farm, said slurry treatment plant comprising: a slurry receiving tank, a slurry pump, a slurry heat exchanger configured to: (i) receive unheated slurry from said livestock farm and (ii) raise the temperature of said unheated slurry to at least 65° Celsius, an intermediate slurry tank configured to: (i) receive said at least 65° Celsius hot slurry from said slurry heat exchanger and (ii) raise the temperature of said heated slurry to at least 75° Celsius, wherein said slurry heat exchanger is further configured to: (i) receive said at least 75° Celsius hot slurry and (ii) exchange heat with said unheated slurry to raise the temperature of said unheated slurry to said at least 65° Celsius and (iil) to cool said at least 75° Celsius hot slurry to at most 40° Celsius, and a slurry reservoir configured to receive and store said at most 40° Celsius cold slurry.

13. The slurry treatment plant according to claim 12, wherein said slurry treatment plant comprises an auxiliary slurry heat exchanger arranged for further heating of at least 65° Celsius hot slurry.

14. The slurry treatment plant according to claim 12, wherein said slurry treatment plant comprises a cooling unit configured to cool said at most 40° Celsius cold slurry to a temperature at most 30° Celsius.

15. The slurry treatment plant according to claim 12, wherein said slurry treatment plant comprises a mixing unit and a first gas conduit, wherein said first gas conduit is configured to guide ammonia from said slurry heat exchanger or said intermediate slurry tank to said mixing unit, and wherein said mixing unit is configured to dissolve ammonia received from said first gas conduit in at least a portion of said at most 40° Celsius cold slurry.

16. The slurry treatment plant according to claim 12, wherein said slurry treatment plant comprises an auxiliary slurry heat exchanger configured to raise the temperature of said at least 65° Celsius hot slurry.

17. The slurry treatment plant according to claim 12, wherein said slurry treatment plant comprises a second gas conduit, a combustion chamber, and an exhaust gas conduit, wherein said second gas conduit is configured to guide ammonia from said slurry heat exchanger or said intermediate slurry tank to said combustion chamber for combustion of said ammonia, and wherein said exhaust gas conduit is configured to guide exhaust gases of said combustion to said auxiliary slurry heat exchanger.

18. The slurry treatment plant to claim 12, wherein said slurry treatment plant comprises a ventilation air conduit configured to guide ventilation air from said livestock farm to said combustion chamber for combustion of said ventilation air.

19. The slurry treatment plant according to a claim 12, wherein said intermediate slurry tank comprises at least one heating element arranged to raise the temperature of said at least 65° Celsius hot slurry to at least 75° Celsius in said intermediate slurry tank.

20. The slurry treatment plant according claim 12, wherein said slurry treatment plant comprises a heat pump arranged to provide heat to said intermediate slurry tank by transfer of heat from said at most 30° Celsius cold slurry to said intermediate slurry tank.

21. The method according to claim 1, wherein the temperature of said at least 65° Celsius hot slurry is raised to a temperature in the range from 80° Celsius to 95° Celsius, in said intermediate slurry tank.

* * * * *